United States Patent
Plummer

(10) Patent No.: US 6,766,399 B1
(45) Date of Patent: Jul. 20, 2004

(54) APPLICATION PROGRAMMING INTERFACE FOR TEMPORARY RELEASE OF ASSOCIATED FILE LOCKS ON STORAGE DEVICES

(75) Inventor: David W. Plummer, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 483 days.

(21) Appl. No.: 09/852,414

(22) Filed: May 10, 2001

(51) Int. Cl.[7] .......................... G06F 13/24; G06F 13/36
(52) U.S. Cl. ..................................... 710/260; 710/306
(58) Field of Search .............................. 710/306, 107, 710/240, 260

(56) References Cited

U.S. PATENT DOCUMENTS 5,150,467 A * 9/1992 Hayes et al. ................ 710/107

OTHER PUBLICATIONS

"Hardware Contention Serialization Algorithm" by IBM Technical Disclosure Bullentin, Apr. 1995.*
"Program Serialization Blocking Unwanted Events, Preventing Unbounded Watits", by IBM Techinical Disclosure Bullentin, Nov. 1993.*

* cited by examiner

Primary Examiner—Tim Vo
(74) Attorney, Agent, or Firm—Shook, Hardy & Bacon, L.L.P.

(57) ABSTRACT

A method is provided for use in a computer system for performing an action on a storage volume being monitored by a program. The method includes the issuing of a command to suspend the notification handles associated with the storage volume and that are set up by the monitoring program. The notification handles associated with the storage volume are then suspended so as to allow performance of the action on the storage volume. Thereafter, a command is issued to resume the notification handles. The command results in a reinstitution or resumption of the notification handles associated with the storage volume. The invention additionally provides for enumeration of all the storage volumes being monitored prior to suspending the notification handles. Further, if the change to the storage volume is substantial in nature such that a user should be informed, an indication can be made to the user that the storage volume has changed.

18 Claims, 3 Drawing Sheets

APPLICATION PROGRAMMING INTERFACE FOR TEMPORARY RELEASE OF ASSOCIATED FILE LOCKS ON STORAGE DEVICES

TECHNICAL FIELD

The present invention relates to a computer system and, more particularly, to an application programming interface that allows the temporary release of file locks and notifications that are associated with a monitored volume.

BACKGROUND OF THE INVENTION

In existing operating systems, it is oftentimes the case that a particular storage volume (such as a file or folder) when opened, is also monitored by a subsystem or client of the operating system. More specifically, the opened volume results in the subsystem setting up a number of notification handles ("notifications") so that the monitoring subsystem can tell if the volume is transferred, added to, deleted, renamed, or changed in size. In the past, this act of monitoring the volume for changes resulted in the inability of a user to use any of the drives that comprised the volume. For instance, it was not possible to format the volume or remove the by volume from the system.

A particular example of the above situation involves the shell of an operating system. It is now common for operating systems to have a shell which provides a system user interface. The shell is a piece of software (either a separate program or a component of the operating system) that provides direct communication between the user and the operating system. Oftentimes, a storage volume is displayed by the shell via the system user interface. The very act of having the shell display the volume requires that the shell monitor the volume for changes to, additions to, or deletions of the files present. This monitoring prevents the operating system or client process from acting on the displayed volume. It has been found that there is often a desire on the part of users to perform certain actions, such as formatting, on the storage volume. It is inconvenient and nonsensical not to allow a user to perform operations on the storage volume simply because the user is currently viewing it via the user interface.

Accordingly, there is a need for an effective system and method for allowing a user to modify a volume that is being monitored by some other system or client of an operating system. A system and method which allows such changes to an open volume without interfering with the monitoring functions of the monitoring subsystem or clients of the operating system is also needed.

SUMMARY OF THE INVENTION

Accordingly, the present invention provides for a method of performing an action on a storage volume that is being monitored by another program. More specifically, the method includes issuing of a command to suspend the notification handles that are associated with the storage volume and that were set up by the monitoring program. Thereafter, the inventive method suspends the notification handles associated with the storage volume. After the notifications have been suspended, the action can be performed on the storage volume. After the action has been performed on the storage volume, a command is issued to resume or re-institute the notification handles associated with the storage volume. Thereafter, all of the notification handles associated with the storage volume are re-instituted and the monitoring of the storage volume is again active.

The method according to the present invention further includes the enumeration of all volumes that are being monitored prior to suspending the notifications associated with the storage volume. Additionally, if the change made to the storage volume is of a substantial nature, such that the monitoring program should be informed, an indication is made to the monitoring program that a substantial change has been made.

Additional advantages and novel features will be set forth in the description which follows and in part may become apparent to those skilled in the art upon examination of the following or may be learned by practice of the invention.

BRIEF DESCRIPTION OF THE SEVERAL VIEWS OF THE DRAWING

The present invention is described in detail below with reference to the attached drawing figures, wherein.

DETAILED DESCRIPTION OF THE INVENTION

Figure 1:
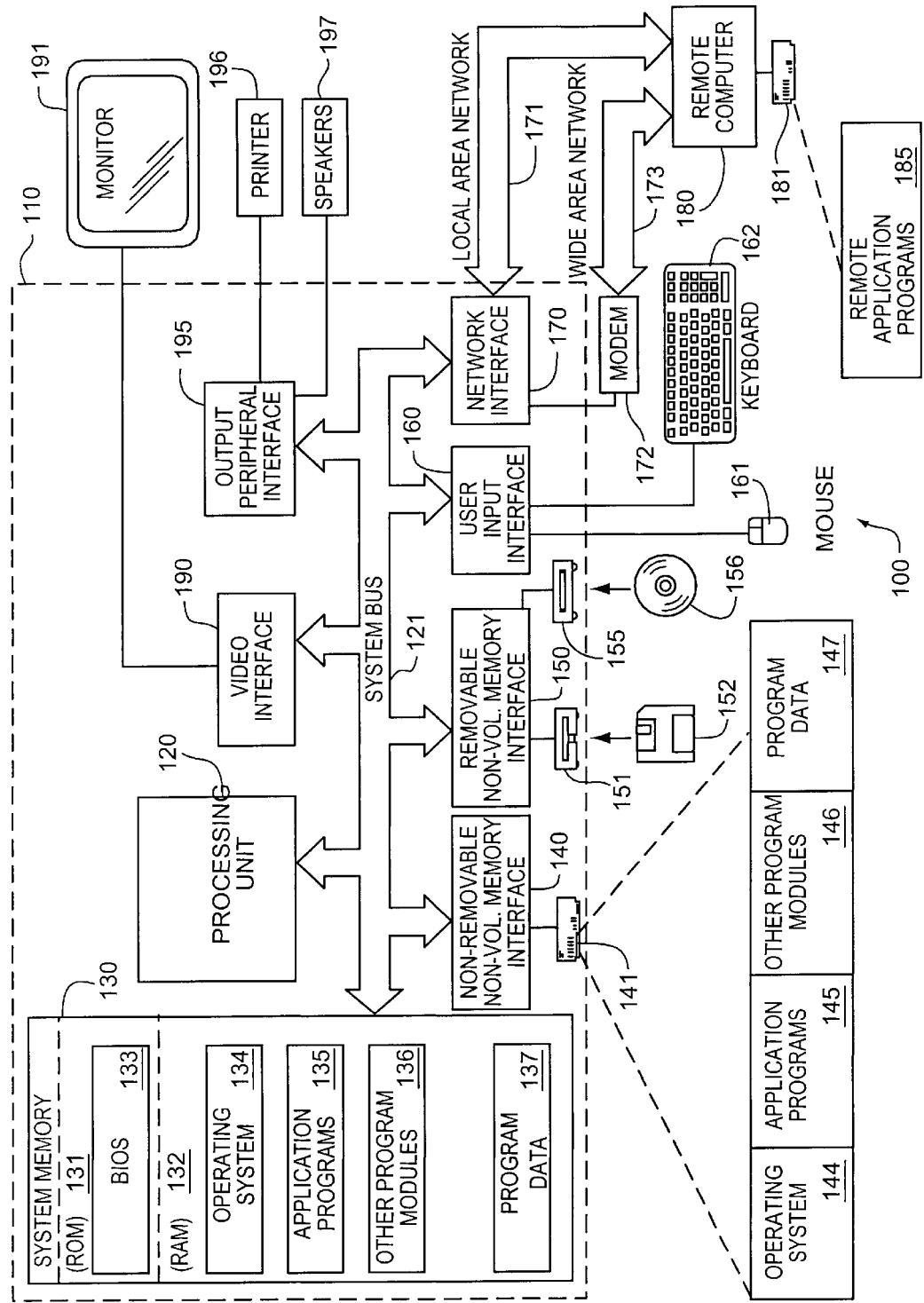
FIG. 1 is a block diagram of a computing system environment suitable for use in implementing the present invention.

The present invention provides a system and method for allowing the temporary release of file locks and notification handles ("notifications") that are associated with a monitored storage volume, such as a file or folder. FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and nonremovable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Those skilled in the art will understand that program modules such as the operating system 134, application programs 135 and data 137 are provided to the computer 110 via one of its memory storage devices, which may include ROM 131, RAM 132, hard disk drive 141, magnetic disk drive 151 or optical disk drive 155. Preferably, the hard disk drive 141 is used to store data 137 and programs, including the operating system 134 and application programs 135.

When the computer 110 is turned on or reset, the BIOS 133, which is stored in the ROM 131 instructs the processing unit 120 to load the operating system from the hard disk drive 141 into the RAM 132. Once the operating system 134 is loaded in RAM 132, the processing unit 120 executes the operating system code and causes the visual elements associated with the user interface of the operating system 134 to be displayed on the monitor 191. When an application program 135 is opened by a user, the program code and relevant data are read from the hard disk drive 141 and stored in RAM 132.

An example of the present invention will be described in conjunction with the shell program of operating system 134. A shell is a piece of software (either a separate program or a component of an operating system) that provides direct communication between the user and the operating system. In the present example, the shell resides in operating system 134. The shell of operating system 134 is used to display an open volume, such as a file or folder, on a monitor 191. The very act of having the storage volume displayed on monitor 191 results in the shell monitoring the storage volume for changes to, additions to, or deletions of the files present. More specifically, the shell sets up a number of notification handles ("notifications") related to the open storage volume which results in the storage volume being "locked" from being acted upon by a user. More specifically, such "actions" of the user could comprise formatting the folder or deleting or adding to the storage volume in any manner. The notifications therefore prevent a user from doing simple functions to an open storage volume, for instance, formatting, while the storage volume is displayed on the screen. The present invention is directed to addressing the nonsensical drawback associated with a typical operating system 134.

Figure 2A:
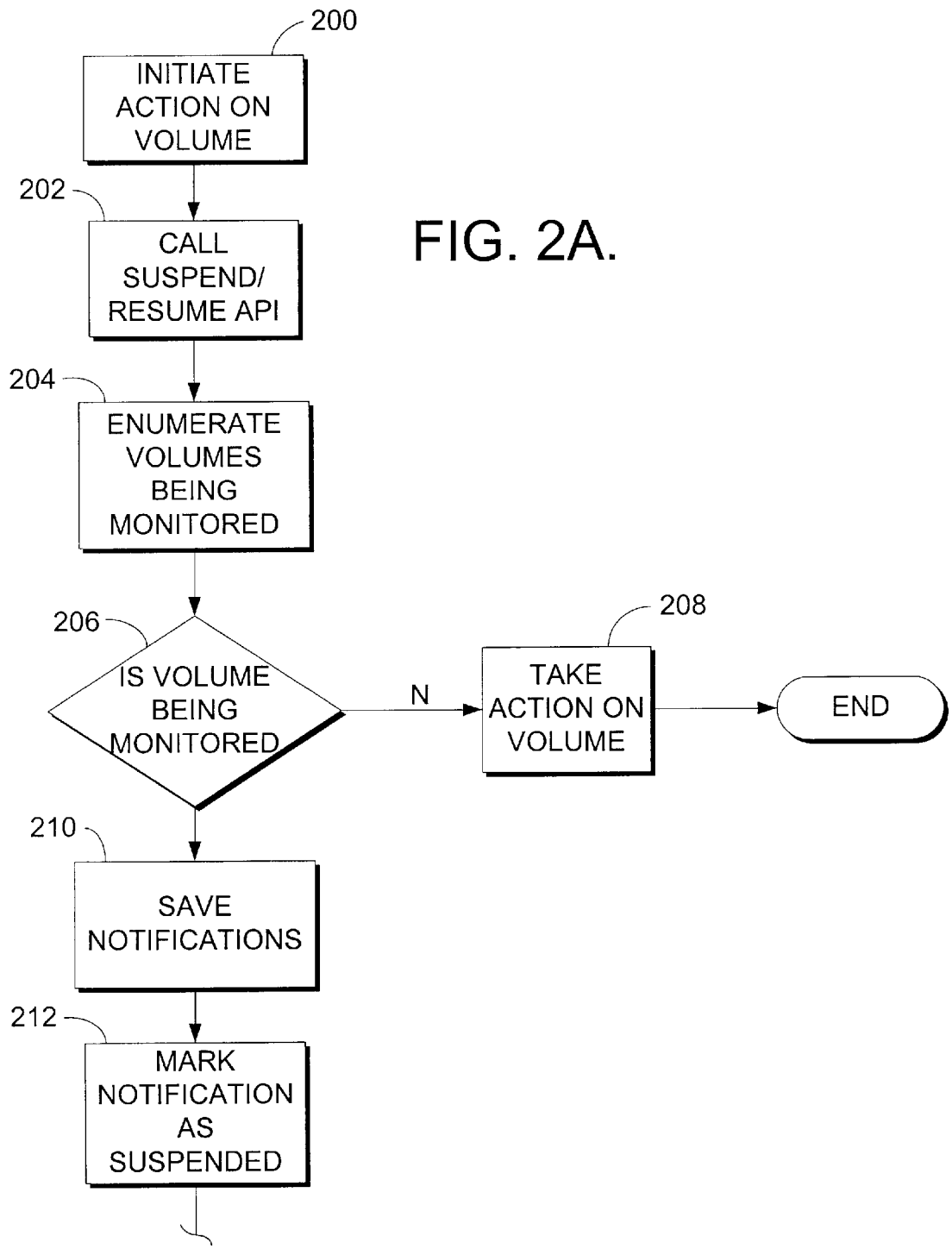
FIG. 2 is a flow diagram illustrating the method of the present invention.
Figure 2B:
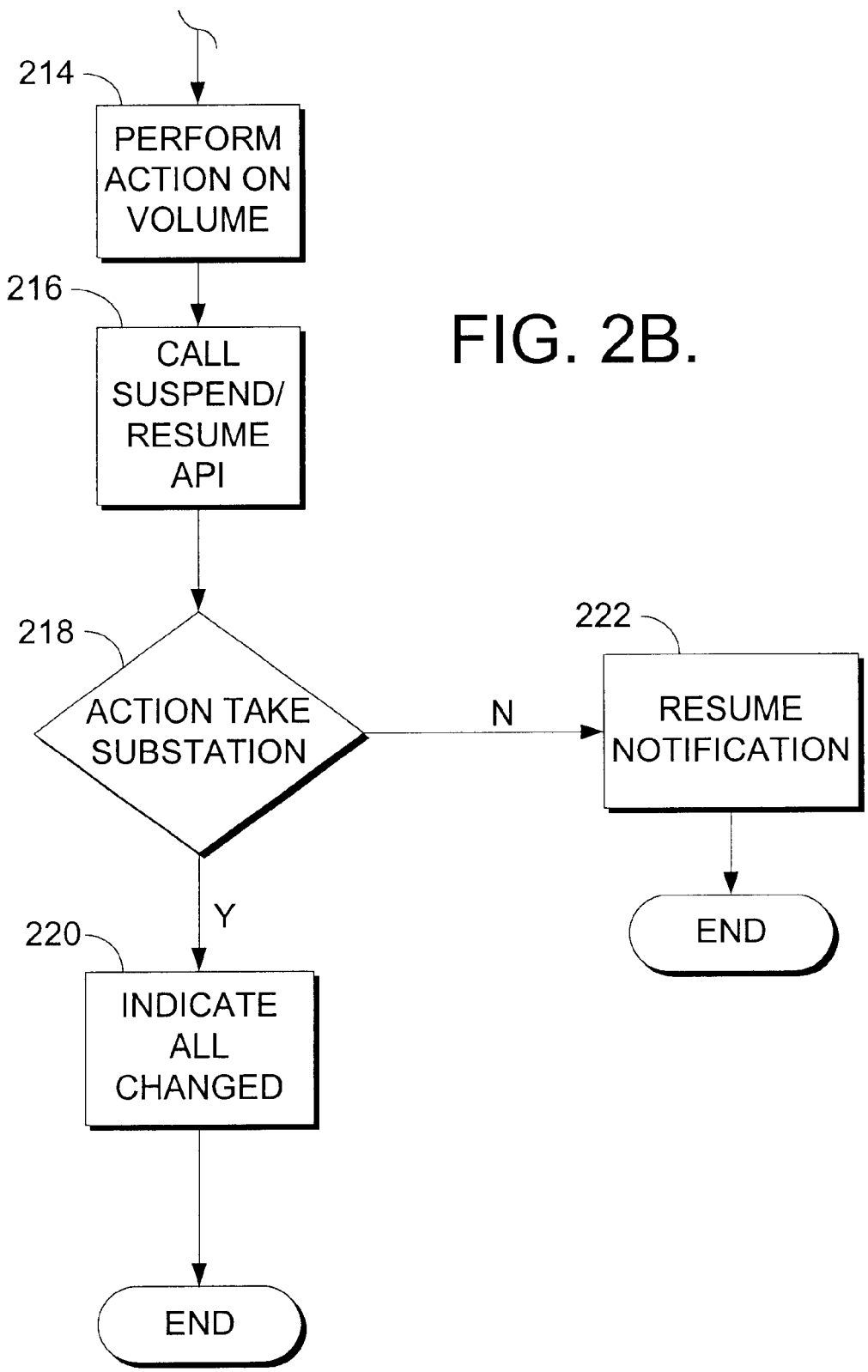

With reference to FIG. 2, a method according to the present invention will be described. More specifically, assuming a storage volume is opened and displayed on monitor 191, and a user now wishes to act upon that storage volume (for instance, by formatting the volume), the user will first try to initiate action on the volume. Upon initiation of action 200, a call to an internal suspend/resume application program interface ("API") of the operating system will be made as indicated at 202. This call to the new internal suspend/resume API will result in suspension of the notifications, as will be further described below. More specifically, whenever any action is to be taken on an open volume, the suspend/resume API will be called automatically at step 202 by the operating system once a process is initiated at 200 for performing a low level/intrusive task on the open volume, for instance, formatting the open volume.

After the suspend/resume API has been called at step 202, a step 207 is performed in which all the storage volumes that are being monitored by the shell of the operating system are enumerated. More specifically, the API does not determine at that time whether the volume that is to be acted upon is being monitored, but simply enumerates all volumes that are being monitored by the shell. At step 206, it is determined whether the volume that is to be acted upon is one of the enumerated monitored volumes set forth at step 204. If the volume to be acted upon is not one of the volumes being monitored, then the process of acting on the volume (i.e., formatting) takes place at step 208 and the routine ends. However, if it is determined that the volume being acted upon is one of the volumes being monitored, the notifications associated with the volume to be acted upon are saved at step 210. After the notifications of the monitored volume have been saved, each of the notifications of the monitored volume are indicated as suspended at step 212. Thereafter, the action can take place on the volume at step 214 because the notifications have been suspended. More specifically, because the notifications have been indicated as "null," nothing will prevent a user from performing the action on the open storage volume.

Because it is now desirable to reset the notifications after the volume has been acted upon, the suspend/resume API is again called at step 216. Thereafter, a determination is made at step 218 whether the action on the storage volume taken at step 214 was substantial in nature such that the monitoring program should be informed to that effect. If a determination is made that the action taken is not substantial, then the API will reset or resume the notifications at step 220 and the routine will end. More specifically, the notification handles that were saved at 210 by the API are then put back in place at step 220. If, however, a determination is made at step 218 that the action taken on the storage volume is substantial, an indication will be sent to the monitoring program that the storage volume has been changed substantially. Thereafter, the opened storage volume or any folder or file thereof may be redisplayed or refreshed with the substantial changes incorporated. Thereafter, the routine will end. As is apparent, every time an action is to be taken on an open monitored file, the steps set forth in FIG. 2 will be repeated, and the suspend/resume API will be called.

The suspend/resume API is indicated below:
SHChangeNotifySuspendResume (BOOL bSuspend, LPITEMIDLIST pidlSuspend, BOOL bRecursive, DWORD dwReserved)

In the above suspend/resume API call, the BOOL bSuspend parameter is a Boloean flag indicating whether the notification handles are to be suspend or resumed. LPITEMIDLIST pidlSuspend is a parameter that indicates a structure, array or table which will be filled in with the notification handles. This parameter corresponds to the enumeration of the volumes being monitored at step 204 and the saving of the notifications at step 210. The third parameter of the API is the BOOL bRecursive parameter which is again a Boloean flag indicating whether or not there are subfolders of the storage volume being acted upon that necessitate a recursive suspension of such subfolders. The fourth parameter of the API, DWORD dwReserved, is a reserved variable for future use in the API.

The present invention solves the problem associated with prior art monitoring of open storage volumes. More specifically, the present invention allows a user through a subsystem or some other client program, for instance, a utilities program, to take action on a storage volume that is opened and displayed on monitor 191. In the past such action was not available. The present invention does not interfere with the subsystem or program (such as the operating system shell) that is monitoring the open storage volume. More specifically, the monitoring program never does know that the notification handles have been suspended and re-instituted. The inventive method results in the notification handles being stored for the opened volume, and thereafter all the handles being marked as null or suspended. Thereafter, the action is taken on the storage volume, and the inventive method resumes or reinstalls the notification handles from the stored location, thus resuming the monitoring operation.

As discussed above, an embodiment of the inventive method results in a determination of whether or not an action taken is substantial at step 218, and then, if the action were substantial, to inform the monitoring program that the storage volume has changed significantly at step 220. It may be desirable in certain instances not to have step 218 or step 222 in the routine. In such a case, the routine would just re-institute all the notification handles as indicated at step 220, and step 218 and step 222 would not be present.

As is apparent to one skilled in the art, although this invention is discussed with respect to a shell of an operating system 134, such method and system could be utilized in conjunction with any monitoring subsystem or client. Further, although the invention is described with respect to formatting of an open storage volume, such inventive method and system could be utilized in conjunction with any action to be taken on an open storage volume, for instance, any sort of antiviral or utility program. Additionally, the inventive system and method can be utilized with any sort of storage container, for instance, file folders, subfolders, volumes or files.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

I claim:

1. A method for use in a computer system and for performing an action on a storage volume being monitored by a program, comprising:

issuing a suspend notifications request;

suspending the notifications associated with the storage volume to allow performance of the action on the storage volume;

issuing a resume notifications request based at least upon a completion of the action on the storage volume; and resuming the notifications associated with the storage volume.

2. The method of claim 1, further comprising enumeration of all volumes being monitored, prior to suspending notifications.

3. The method of claim 1, further comprising storing the notifications associated with the storage volume before they are suspended.

4. The method of claim 1, further comprising determining whether the action taken on the storage volume is of a substantial nature, and, if so, informing the monitoring program that a substantial change has been made to the storage volume.

5. The method of claim 1, wherein the monitoring program is a shell.

6. The method of claim 1, wherein the action being performed on the storage volume is formatting.

7. A computer readable medium having computer executable instructions for performing an action on a storage volume being monitored by a program, comprising:

issuing a suspend notifications request;

suspending the notifications associated with the storage volume to allow performance of the action on the storage volume;

issuing a resume notifications request based at least upon a completion of the action on the storage volume; and resuming the notifications associated with the storage volume.

8. The computer readable medium of claim 7, further comprising enumeration of all volumes being monitored, prior to suspending the notifications.

9. The computer readable medium of claim 7, further comprising storing the notifications associated with the open volume before they are suspended, so that they can be resumed at a later time.

10. The computer readable medium of claim 7, further comprising determining whether the action taken on the storage volume is of a substantial nature, and, if so, informing the monitoring program that a substantial change has been made to the storage volume.

11. The computer readable medium of claim 7, wherein the monitoring program is a shell.

12. The computer readable medium of claim 7, wherein the action being performed on the storage volume is formatting.

13. A computer system for performing an action on a storage volume being monitored by a program, comprising:

an issuing component that is capable of issuing both a suspend notifications request and a resume notifications request;

a suspension component that, in response to the suspend notifications request, suspends notifications associated with the storage volume to allow performance of the action on the storage volume;

a resumption component that, in response to a resume notifications request, resumes the notifications associated with the storage volume, the resume notifications request being based at least upon a completion of the action on the storage volume.

14. The system of claim 13, further comprising an enumeration component which enumerates all volumes being monitored prior to suspending notification.

15. The system of claim 13, further comprising a storage component that stores the notifications associated with the storage volume before they are suspended.

16. The system of claim 13, further comprising an informing component which determines whether the action taken on the storage volume is of a substantial nature, and, if so, informing the monitoring program that a substantial change has been made to the storage volume.

17. The system of claim 13, wherein the monitoring program is a shell.

18. The system of claim 13, wherein the action being performed on a storage volume is formatting.

* * * * *